Jan. 25, 1955     C. W. PETERSÉN     2,700,715
POWER REGULATOR
Filed Jan. 29, 1952                                 5 Sheets-Sheet 1
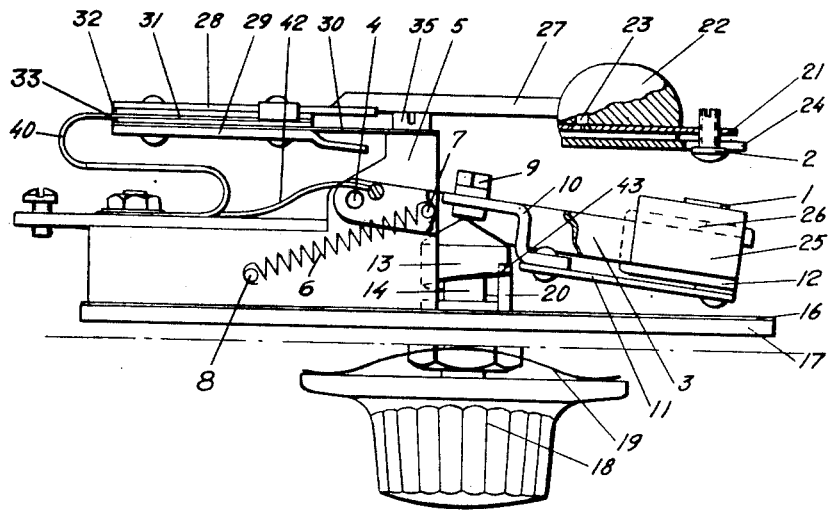
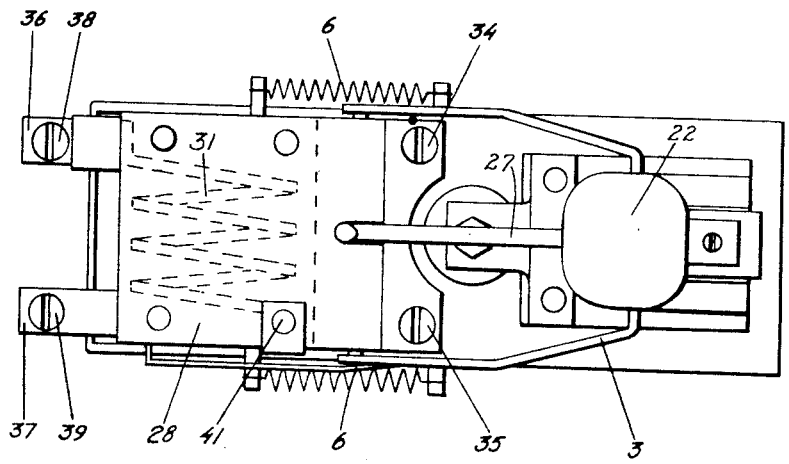
INVENTOR
CURT WILHELM PETERSÉN
BY
ATTORNEYS Jan. 25, 1955
C. W. PETERSÉN
2,700,715
POWER REGULATOR
Filed Jan. 29, 1952
5 Sheets-Sheet 2
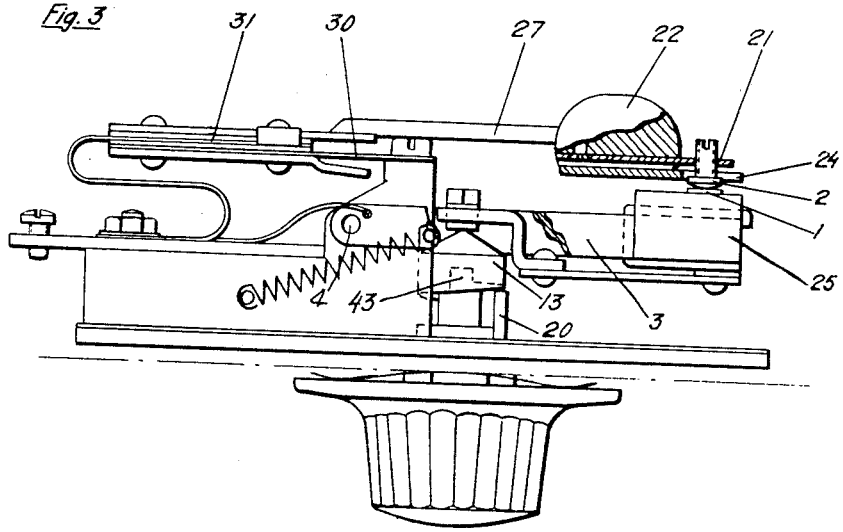
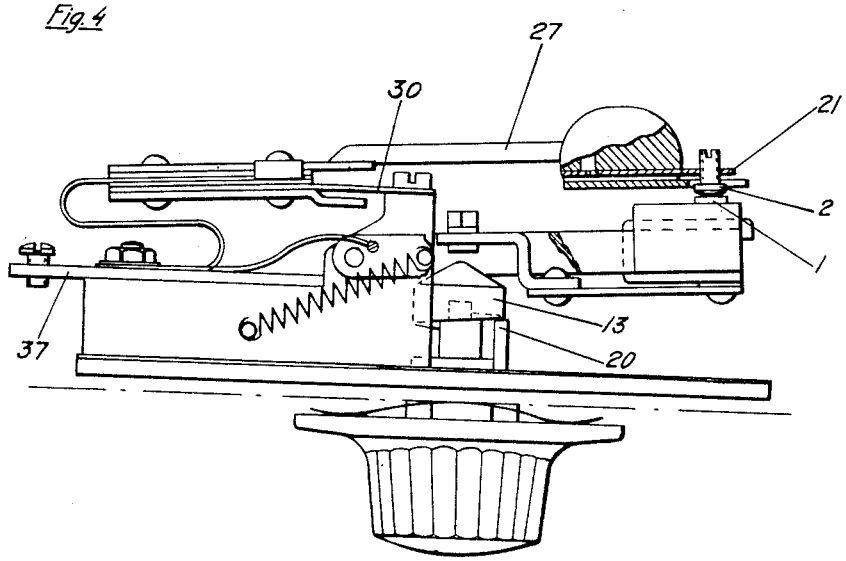
INVENTOR
CURT WILHELM PETERSÉN
BY
ATTORNEYS

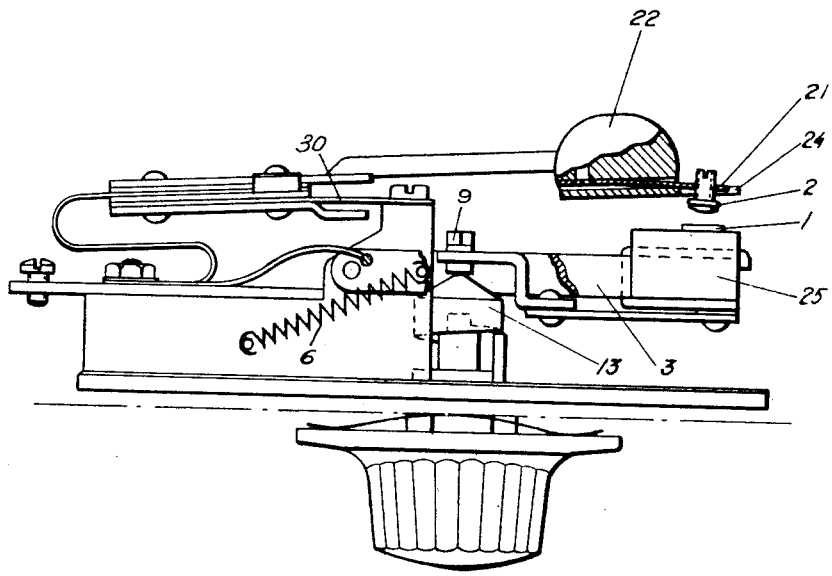
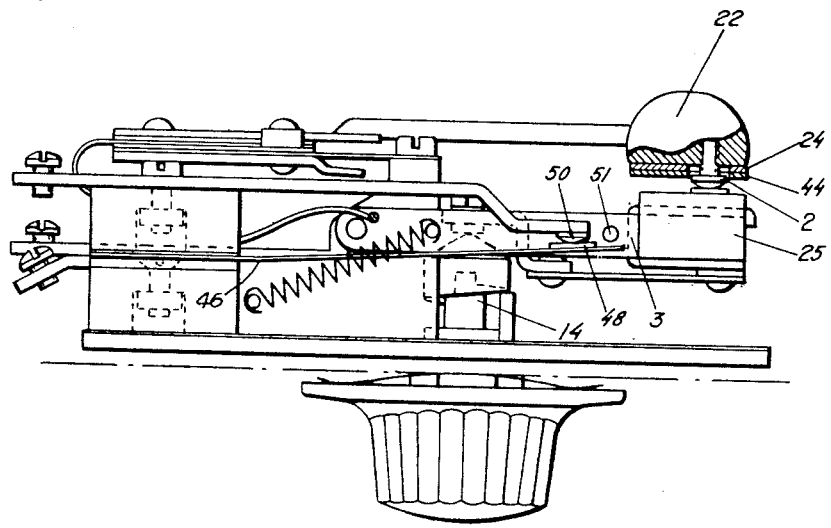

Jan. 25, 1955

C. W. PETERSÉN 2,700,715

POWER REGULATOR

Filed Jan. 29, 1952

INVENTOR
CURT WILHELM PETERSÉN

BY

ATTORNEYS

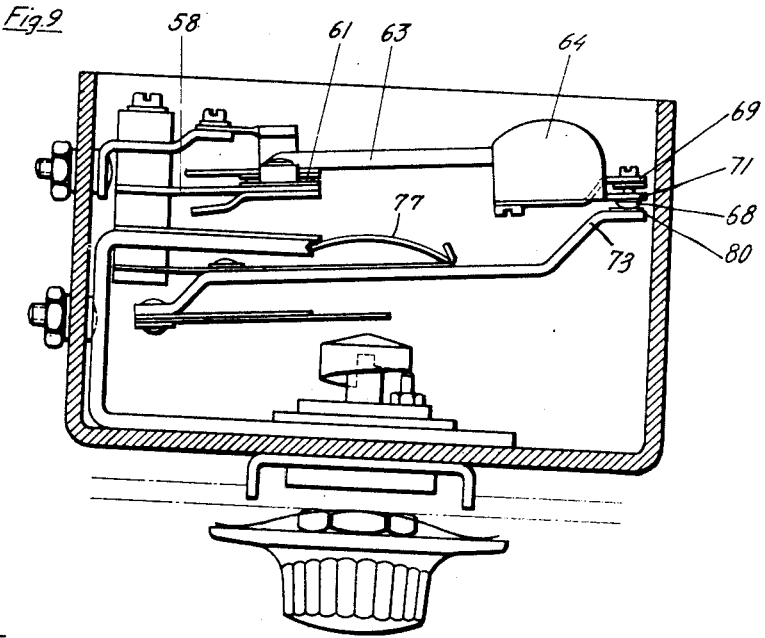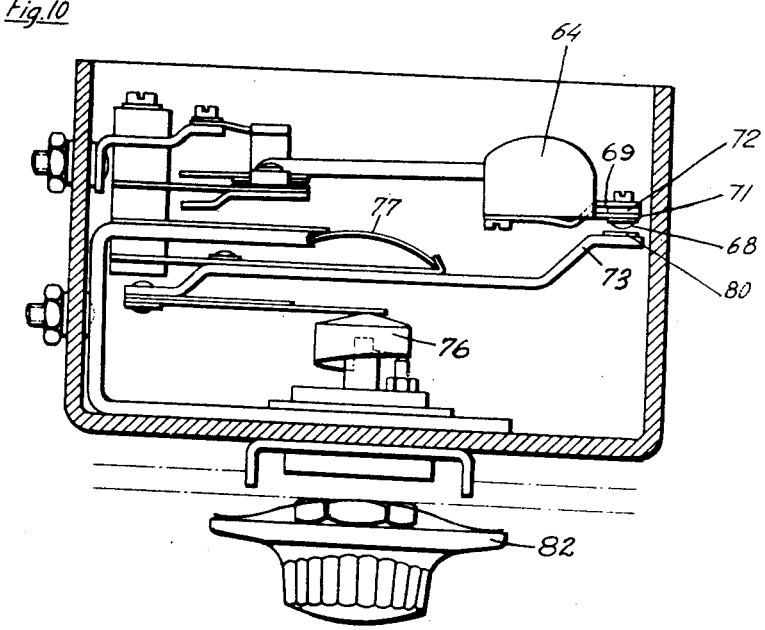

United States Patent Office 2,700,715
Patented Jan. 25, 1955

2,700,715
POWER REGULATOR

Curt Wilhelm Petersén, Stensholm, Huskvarna, Sweden, assignor to Stensholms Fabriks Aktiebolag, Stensholm, Sweden Application January 29, 1952, Serial No. 268,741

Claims priority, application Sweden January 31, 1951

14 Claims. (Cl. 200—122)

The present invention relates to power regulators. More particularly, the invention relates to such power regulators for electric heating apparatus, especially electric hot-plates, as are provided with heating circuit controlling contacts, which are rapidly opened periodically against the action of a force, which strives to hold the contacts against each other, under the action of a bi-metallic strip or other temperature sensitive member, which is in good thermal contact with a resistance included in the regulator and passed by a current which is substantially proportional to the current in the heating circuit of the heating apparatus the power of which is to be regulated.

It is a primary object of the invention to provide a power regulator for electric heating apparatus, by means of which a first connecting-in period of extended duration is obtained, thereby securing a rapid heating of the hot-plate or other heating apparatus to the desired operating temperature.

Another object of the invention is to provide a power regulator for electric heating apparatus, in which one or more further connecting-in periods of extended duration are obtainable after ordinary regulation has set in, e. g. to secure accelerated heating of the cold contents of a cooking pot placed on a hot-plate, the temperature of which has already reached the ordinary operating value.

Other objects of the invention will become apparent from the following detailed description of suitable embodiments with reference to the attached drawings.

On the drawings:

Fig. 1 is a side view of a power regulator according to a first embodiment, the parts being shown in zero position.

Fig. 2 is a top view of the regulator according to Fig. 1.

Figs. 3, 4 and 5 are views similar to Fig. 1, but showing the regulator parts in other operating positions.

Fig. 6 is a side view of a power regulator of slightly modified construction.

Figs. 9 and 10 are side views similar to Fig. 8, but showing the regulator parts in other operating positions.

Figure 7:
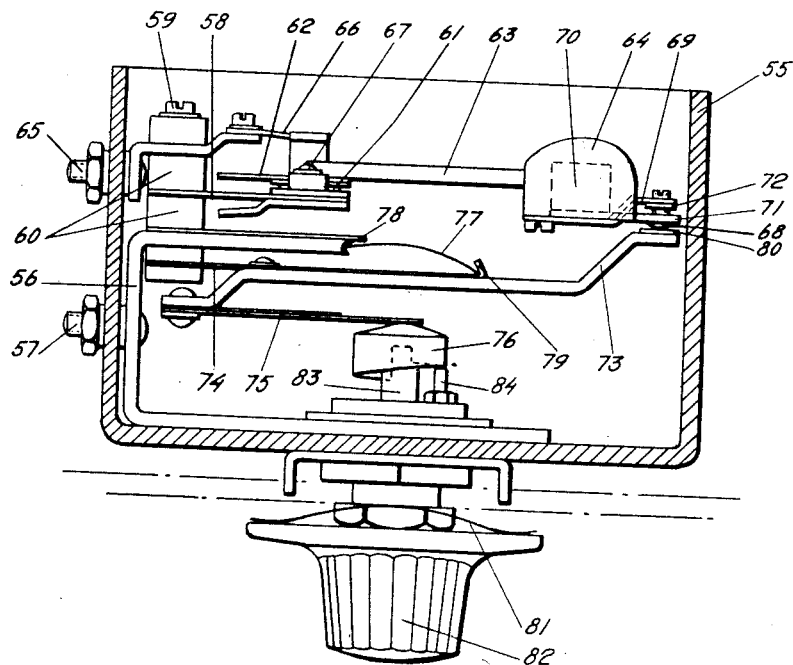
Fig. 7 is a side view of a power regulator according to another embodiment.
Figure 8:
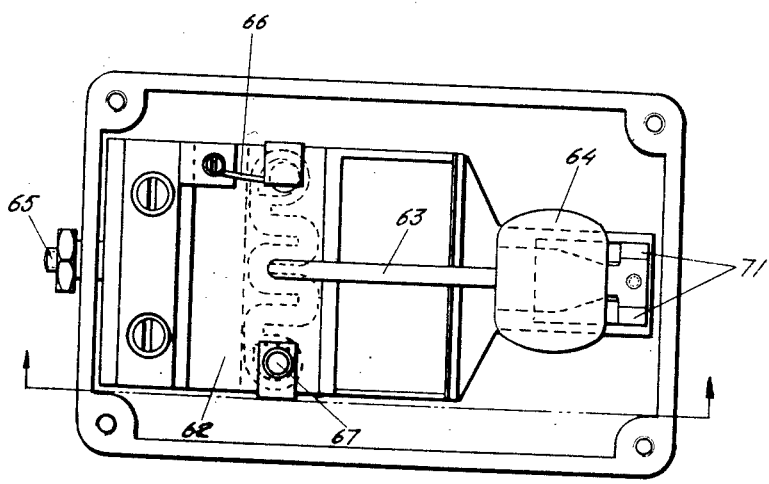
Fig. 8 is a top view of the regulator according to Fig. 7.

In Figs. 1 to 5, the reference numeral 1 designates the fixed or stationary contact of the contact device and 2 the movable contact thereof. The stationary contact 1 is carried at the ends of an arm 3, which is bent to the shape of a U and the two ends of which are pivoted on two pivot pins 4 provided in a frame 5 of insulating material. Two helical springs 6, one end of which is secured to a pin 7 on the arm 3 and the other end of which is secured to a pin 8 in the frame, tend to swing the arm 3 clockwise about its pivots 4. The swinging movement is limited by an abutment on the contact arm which cooperates with an abutment on the frame. In the embodiment shown the abutment on the contact arm 3 consists of a calibrating screw 9 provided at the free end of an arm 10 which is bent to the shape of an L and is fastened by means of screws to one end of a bi-metallic strip 11, the other end of which is secured by means of rivets to a lug 12 on the contact arm 3. The bi-metallic strip 11 is such as to bend downwardly on an increase of temperature.

The abutment, with which the calibrating screw 9 on the contact arm 3 cooperates, can be set in different positions. It consists in the embodiment shown of a cam body 13, provided at the end of a spindle 14, which is turnably and axially displaceably journalled in a bushing 15 passing through a frame plate 17 having an insulating covering 16 on its inside. Provided on the outer end of the spindle 14 is a temperature setting knob 18, between which and the frame plate 17 there is inserted a flat spring 19, under the action of which the cam body 13 is pressed with its cam surface against a fixed abutment 20 provided on the inside of the frame plate 17. The cam body 13 is so shaped that on turning of the knob 18 the body is displaced axially, causing through cooperation with the calibrating screw 9 the contact arm 3 to be swung in one direction or the other, resulting in a change of position of the fixed contact 1 with respect to the frame 5.

The movable contact 2 of the contact device consists of a setting screw provided at the end of a bi-metallic strip 21, which is positioned in a slot-shaped recess on the underside of a heat accumulating body 22 having a high heat capacity and a small cooling surface, the bi-metallic strip 21 being at the end opposite to the contact screw 2 secured to the heat accumulating body by means of a screw 23. On the underside of the heat accumulating body 22 at opposite sides of the bi-metallic strip 21 there are fixedly arranged two legs of a magnet armature 24 which cooperate with a permanent magnet 25, which is secured to a fastening lug 26 on the contact arm 3. The heat accumulating body 22 is carried at the end of a heat conducting rod 27, which at its other end is secured to a pressing plate 28. Clamped in between said pressing plate 28 and a second pressing plate 29 is a bi-metallic strip 30 and a resistance loop 31 which is electrically insulated by means of insulating plates 32 and 33. At its opposite end the bi-metallic strip 30 is clamped to the frame 5 by means of two screws 34 and 35.

Screwed to the frame 5 are, furthermore, two connecting bars 36 and 37, provided each with a terminal screw 38 or 39 respectively for connection to the external circuit. To the connecting bar 36 one end of the resistance loop 31 is connected by means of a flexible conductor 40, whereas the other end of the resistance loop is connected via a conducting screw 41 to the pressing plate 28 and thus also to the movable contact 2. The connecting bar 37 is electrically connected through a flexible conductor 42 with the contact arm 3 and thus also with the stationary contact 1. By means of the terminal screws 38 and 39 the regulator may be connected in series with the heating resistance of an electric heating apparatus, not shown, for example an electric hot-plate, which is connected to an electric power supply.

For setting the regulator in its zero position, Fig. 1, there is provided in the cam body 13 a rectangular recess 43, in which the fixed abutment 20 can be received.

The power or temperature regulator described operates in the following manner:

When the electric hot-plate is to be used, the knob 18 is turned from the zero position shown in Fig. 1 to a position corresponding to the desired temperature of the hot-plate, the abutment or cam body 13 being then displaced axially and inwardly, engaging the calibrating screw 9 and swinging the contact arm 3 against the action of the springs 6 in a counter-clockwise direction, the normally stationary contact 1 then getting in contact with the movable contact 2, see Fig. 3. The circuit through the heating resistance of the hot-plate, not shown, and through the resistance loop 31 of the temperature regulator is then closed. The resistance loop 31 heats the bi-metallic strip 30, causing the said strip to bend downwardly from its starting position shown in Fig. 3 to the position shown in Fig. 4, at the same time swinging the heat accumulating body 22 with the movable contact 2 upwardly. On account of the attraction between the permanent magnet 25 and the armature 24, the contact arm 3 is forced to follow and to turn counter-clockwise about its pivots 4. Part of the heat produced in the resistance loop 31 is conducted through the rod 27 to the heat accumulating body 22, the temperature of which will thereby gradually rise. From the heat accumulating body 22 the heat is conducted further to the bi-metallic strip 21, which carries the movable contact 2. On being heated the bi-metallic strip 21 bends downwardly to the position shown in Fig. 5, causing the distance between the permanent magnet 25 and the armature 24 to gradually increase. Finally the said distance becomes so large, that the attractive force does not any longer suffice to hold the contact arm 3 in its swung-up position, but the contact arm will suddenly swing counter-clockwise under the action of the springs 6 until it is arrested in its starting position by the calibrating screw 9 again engaging the cam body 13, see Fig. 5. When the heat accumulating body 22 and thus also the hot-plate has reached a certain desired temperature, the contact device 1, 2 will thus rapidly open and interrupt the current through the heating resistance of the hot-plate and through the heating loop 31 of the regulator.

It should be noted that the springs 6 are so directed that the moment arm of the spring force will gradually decrease during the swinging of the contact arm 3 from the position according to Fig. 3 to the position according to Figs. 4 and 5, preventing the magnet 25 from dropping the armature 24 and thus also the contact arm 3 too early, when the bi-metallic strip 21 carrying the movable contact 2 bends downwardly.

When the current through the heating loop 31 of the regulator is interrupted, the heating of the bi-metallic strip 30 ceases, whereupon said strip cools down comparatively rapidly and straightens itself out again. Also the temperature of the heat accumulating body 22 will fall, but only slightly on account of the great heat capacity and comparatively small cooling surface of the body. The bi-metallic strip 21, which carries the movable contact 2, therefore retains in the main its bent shape. When the bi-metallic strip 30 has straightened itself out sufficiently, the movable contact 2 will again engage the stationary contact 1, the circuit being then again closed through the heating element of the hot-plate and through the heating loop of the regulator. As a result the bi-metallic strip 30 will again bend downwardly, swinging the movable contact 2 away from the stationary contact 1. This time the bi-metallic strip 21, which carries the movable contact 2, is bent already from the beginning and the distance between the permanent magnet 25 and the armature 24 is thus comparatively greater, wherefore the attractive force does not suffice to swing the contact arm 3 against the action of the springs 6, but the contact arm 3 and thus also the fixed contact 1 will remain stationary. When the spring tension in the bi-metallic strip 30 on account of the heating from the heating loop 31 becomes sufficiently great, the movable contact 2 will leave the now stationary contact 1, also said opening movement taking place momentarily, by that the attractive force between the permanent magnet 25 and the armature 24 decreases more rapidly than the increase of the distance between magnet and armature. During normal regulation the fixed contact 1 will thus remain stationary, while the movable contact 2 will move periodically downwardly and upwardly, alternately closing and interrupting the circuit. The regulator according to the invention thus ensures a prolonged first connecting-in period for the heating resistance of the hot-plate, so that the hot-plate is brought up approximately to the desired temperature very rapidly, and said temperature is thereafter maintained within narrow limits by repeatedly connecting the heating element into circuit during short heating periods interrupted by disconnecting or cooling periods.

When the hot-plate is to be disconnected, the knob 18 is turned back to the position shown in Fig. 1, in which the stationary abutment 20 is received in the rectangular recess 43 in the cam body, the contact arm 3 then swinging down to its lower limit position shown in the figure, interrupting the heating circuit at the contacts 1, 2.

It will be readily understood that it is possible, through a suitable adjustment of the movable contact 2 formed as a setting screw, to change the force which holds the contacts pressed against each other, in that said force becomes smaller the further the contact screw is screwed into the bi-metallic strip 21. With the aid of the calibrating screw 9 on the abutment arm of the contact arm 3 the regulator can be calibrated for the purpose of adjusting the relative lengths of the current closing and current interrupting periods. The bi-metallic strip 11, which carries the calibrating screw 9, serves only to compensate for changes in the ambient temperature, in that the bi-metallic strip 11 will bend downwardly on increasing temperature, thereby forcing the contact arm 3 with the fixed contact 1 to swing upwardly in correspondence to the up-swinging movement of the movable contact 2 caused by the corresponding heating of the bi-metallic strip 30.

With the aid of the regulator shown in Figures 1–5 it is possible, for example, to boil a small quantity of water or to heat a larger quantity without any supervision whatever. The knob 18 then must have been in the zero position shown in Fig. 1 for some time, whereupon the knob is pushed in to its contact closing position. Hereafter the knob 18 is released, the knob together with the cam body 13 then returning to its zero position under the action of the flat spring 19, whereas the contact arm 3 with the contact 1 is retained in closing position by the magnet 25 until the heat accumulating body 22 and thus also the bi-metallic strip 21 has reached the temperature, at which the distance between magnet and armature has become so large that the contact arm 3 is pulled back by the springs 6 to the position shown in Fig. 1, the current being then definitely interrupted. It can be said that the power regulator, when used in this manner, eliminates the risk for boiling the cooking pot dry.

The regulator shown in Fig. 6 differs from the one shown in Figures 1 to 5 in the first instance therein, that the arrangement for holding the contacts against each other with a force that depends on the temperature of the heat accumulating body is of modified construction. The movable contact 2, having the form of an adjusting screw, is here screwed into the heat accumulating body 22, so that contact 2 will take up a fixed position with respect to the latter. The desired variation in attractive force between the permanent magnet 25 and the armature 24 is here effected by providing, between the permanent magnet and the armature, a plate 44 manufactured from an alloy which is attracted by a magnet at low temperatures but loses its magnetic properties entirely or partly at higher temperatures.

Another special feature of the regulator shown in Fig. 6 is that the regulator is provided with two extra switches, which are opened when the temperature adjusting device is in its zero-position. Provided at each side of the regulator is a contact spring 46, which at one end is clamped to the frame and at its other end carries a contact 48, which cooperates with a fixed contact 50. For actuation of the contact springs 46 there is secured in the contact arm 3 a transversely extending rod 51 of glass, Bakelite or the like, which rod when the contact arm 3 swings down to its zero-position engages the contact springs 46 and opens the contacts 48, 50.

If desired, the regulator according to Fig. 6 can have two zero-positions, one of which prevents the regulator switch from reaching contact position, e. g. through cooperation between a cam disk secured to the regulating spindle 14 and an arm secured to the stationary contact part.

The embodiments of the invention illustrated in Figs. 1 to 6 are designed to provide for only one initial connecting-in period of extended duration. The modification illustrated in Figs. 7 to 10 is such as to make it possible to obtain further connecting-in periods of extended duration after ordinary regulation has set in.

In Figs. 7 to 10 the reference numeral 55 designates a box-like frame of insulating material, 56 a flat iron which is bent to the shape of a U, is fixedly united with the frame and is in electrically conducting connection with one terminal bolt 57 of the regulator. To the upper leg of the frame iron 56 is secured one end of a bi-metallic spring 58 by means of an insulated bolt 59 and insulating spacers 60. The reference numeral 61 designates a heating winding, which is electrically insulated from but is in good thermal contact with the bi-metallic spring 58 and with an upper press plate 62, with which is rigidly connected one end of a heat conducting rod 63, which at its other end carries the heat accumulating body 64. One end of the heating winding 61 is connected with the terminal bolt 65 through a flexible conductor 66, whereas the other end thereof is conductively connected through a bolt 67 with the press plate 62. The latter is in turn electrically connected through the rod 63 with the heat accumulating body 64, which serves as a carrier for the contact 68 which is movable during ordinary regulation. Said contact 68 is positioned at the end of a small bi-metallic spring 69 which is clamped to the heat accumulating body 64 at its opposite end and is arranged to take up at normal temperature its normal position shown in Fig. 7 with an initial tension. Reference numeral 70 designates a permanent magnet, which is cast into the heat accumulating body 64, said magnet exerting through two blade-shaped pole-shoes 71 an attractive force on an armature 72 secured at the end of the small bi-metallic spring 69.

The carrier of the contact, which remains stationary during ordinary regulation, consists of an arm 73 which at one end is swingably connected with the bolt 59 by means of a hinge spring 74. Through the intermediary of a bi-metallic spring 75, which is secured at one end to the arm 73 and serves to compensate for changes in the ambient temperature, the arm 73 normally rests on an abutment 76 under the action of a thin rectangular spring plate 77, which at two opposite edges is pressed in between a groove 78 at the end of the upper leg of the frame iron 56 and an angle 79 on the arm 73. At its free end the arm 73 carries an armature 80, which serves as a contact, the magnet 70 exercising on said armature 80 through its pole-shoes 71 a force, which strives to hold the two contacts 68 and 80 pressed against each other. The abutment 76 is shaped as a cam body, which is situated at the end of a turnable and against the action of a spring 81 axially displaceable spindle 83 provided with an operating knob 82, said cam body 76 cooperating with a fixed abutment 84.

When the regulator is to be connected into circuit, the contacts 68 and 80 are brought in contact with each other by turning the knob 82, Fig. 7. The contacts then close, in series with the heating resistance 61 of the regulator, the heating circuit of the heating apparatus which is assumed to be connected to the terminal bolts 57 and 65. The current in the heating resistance 61 causes the temperature of the bi-metallic spring 58 to rise, and the spring will bend upwardly, Fig. 9. On account of the small distance between the pole-shoes 71 of the magnet 70 and the armature 80 on the contact arm 73 in the starting position, the attractive force between the pole-shoes and the armature is so great to begin with, that the arm 73 is forced to follow the heat accumulating body 64 and swing upwardly against the action of the spring 77. Because of the heat transport from the regulator heating resistance 61 through the rod 63 to the heat accumulating body 64, the temperature of the latter will also rise, and finally the temperature becomes so high that the bi-metallic spring 69, which carries the contact 68, starts to bend downwardly while overcoming the initial tension in the spring, the distance between the pole-shoes 71 and the armature 80 on the arm 73 then increasing. Finally the distance becomes so great that the attractive force, which decreases with an increasing distance, cannot any longer retain the arm 73 in its swung-up position but said arm returns rapidly under the action of the restoring spring 77 to its starting position, Fig. 10. The circuit through the heating resistance 61 of the regulator and through the heating resistance of the heating apparatus is thereby interrupted.

After interruption of the said circuit, the temperature of the bi-metallic spring 58 starts to sink, the bi-metallic spring straightens itself, and finally the contacts 68 and 80 again come to bear on each other. The temperature of the heat accumulating body 64 will also sink, but on account of the great heat capacity and small cooling surface of said body to a smaller degree. Also the bi-metallic spring 69, which carries the contact 68, thus strives to return to its starting position. However, the bi-metallic spring 69 cannot do this, because the attractive force between the pole-shoes 71 and the armature 72 is too great to be overcome by the tension set up in the comparatively weak bi-metallic spring. The contact 68 therefore is retained in its attracted position, in which it keeps the armature 80 on the arm 73 at its maximum distance from the pole-shoes 71. The attractive force between the pole-shoes 71 and the armature 80 therefore is so low that the arm 73 remains stationary in its normal position, resting against the abutment 76 under the action of the spring 77, the next time the heat accumulating body 64 moves upwardly. The regulator therefore now starts to regulate in ordinary manner by repeatedly opening and closing the circuit while the contact 80 remains at rest.

After the normal regulation has set in, the temperature of the heat accumulating body 64 will fall below the value, at which the bi-metallic spring 69 starts to bend while overcoming its initial tension. If, therefore, the armature 72 is removed with force from the pole-shoes 71, the bi-metallic spring will snap back to its starting position and will remain in said position until the temperature of the heat accumulating body 64 has again risen to a value higher than the one prevailing during normal regulation, and in this manner a new extended connecting-in period will be obtained. All one has to do to cause the bi-metallic spring 69 to snap back to its starting position, is to press the knob 82 without turning the same, the arm 73 being then forced to swing upwardly and to exercise through its contact 80 a pressure on its countercontact 68, which is sufficiently great to overcome the attractive force between the pole-shoes 71 and the contact 68.

The invention is not limited to the embodiments shown on the drawings and described above in detail, but modifications are conceivable within the scope of the appended claims.

I claim:

1. In a switch; a frame, an arm flexibly mounted at one end in said frame having a first contact on its free end, a rod co-planar with said arm having one end flexibly connected to said frame and having a strip on its free end and a second contact on said strip for engagement with said first contact, first means adjacent the free ends of said arm and rod for holding said contacts in engagement, said strip coacting with said first means to decrease the holding action as said strip is heated, thermal responsive means for urging said rod away from said arm, heater means for supplying heat to said thermal responsive means and to said strip, said arm having a stopped position and being movable therefrom toward said rod, and spring means resisting movement of said arm away from its stopped position.

2. An arrangement according to claim 1 in which the said heater means comprises a resistance heating element connected in series with one of said contacts.

3. An arrangement according to claim 2 in which the said thermal responsive means comprises a bi-metallic element supporting said rod at the end opposite the said contact thereon, said resistance heating element being arranged in heat transferring relation therewith, and the heat supplied to said bi-metallic strip being conducted along said rod thereto.

4. An arrangement according to claim 1 in which the said thermal responsive means comprises a bi-metallic element supporting the end of said rod opposite the contact end thereof, said heater means comprising a resistance heating element in series with one of said contacts and in heat transferring relation with said bi-metallic element, the heat for said bi-metallic strip being conducted along said rod thereto from said bi-metallic element, and there being a heat accumulating mass thermally associated with said rod adjacent its connection with said bi-metallic strip.

5. An arrangement according to claim 4 in which the said first means comprises a magnet on one of said rod and arm and an armature on the other thereof, and said spring means being of sufficient strength to prevent movement of the arm with the rod when the bi-metallic strip is flexed but insufficient to prevent said movement when the bi-metallic strip is not flexed.

6. An arrangement according to claim 4 in which the said first means adjacent the free endes of said arm and rod for urging said contacts on the rod and arm together comprises a magnet on one of said rod and arm and an armature on the other thereof, and said spring means being of sufficient strength to prevent movement of the arm with the rod when the bi-metallic strip is flexed but insufficient to prevent said movement when the bi-metallic strip is not flexed, said spring being connected between said arm and frame in such a manner as to decrease in effectiveness as said arm moves with said rod away from the said stopped position of said arm.

7. An arrangement according to claim 4 in which the said stopped position of said arm is provided by an abutment carried by said frame and engageable by said arm, said abutment being rotatable and comprising a spiral cam surface, a stop on the frame engaging said surface whereby rotation of said abutment will adjust the stopped position of said arm, said abutment also being movable bodily on the frame to move said arm into position to engage the contact thereon with the contact on said rod, and resilient means urging the abutment toward said stop.

8. In a switch; a frame, an arm having one end flexibly mounted in said frame and carrying a first contact at its free end, a rod co-planar with said arm having one end flexibly mounted in said frame and having a bi-metallic strip extending from its free end and a second contact on the free end of said strip adapted for engagement with said first contact, said strip flexing towards said arm when heated, a magnet on said rod adjacent the free end thereof and an armature on said arm adjacent the free end thereof cooperating with said magnet for holding said contacts together when the free ends of the rod and arm are brought into proximity, an abutment in the frame engageable by said arm for providing a stopped position for said arm in movement away from said rod, and said abutment being adjustable in said frame in the direction of movement of said arm, spring means urging said arm towards said abutment and insufficient to overcome the attraction of said magnet for said armature when said strip is unflexed but overcoming said attraction when the said strip is flexed, heat accumulating means on said rod in the region of its connection with said strip, a bi-metallic element supporting said rod on said frame and flexing in a direction to move the rod away from the arm when heated, a resistance heating element in series with one of said contacts in heat transferring relation with said element, and means associated with said arm for adjusting the position thereof in response to changes in ambient temperature.

9. An arrangement according to claim 8 in which the free end of said bi-metallic strip comprises an armature that comes under the influence of said magnet when the strip is flexed in order to hold the strip in its flexed position after it cools, and said abutment being bodily movable in the direction of adjustability thereof without effecting the adjustment thereof to move said arm towards said rod thereby bringing said contacts into engagement and dislodging the last mentioned armature from its attracted position relative to said magnet.

10. An arrangement according to claim 1 in which the stopped position of said arm is provided by an adjustable abutment, said abutment being adjustable into a zero position where the said contacts are separated, and there being auxiliary switch means in said frame adapted for connection in series with said contacts, and said arms having means for engaging and opening said auxiliary switch means when the said arm is moved to its zero position.

11. An arrangement according to claim 8 in which the said abutment including a zero position of adjustment in which the said arm is moved to a zero position so the said contacts are separated from each other, and there being auxiliary switch means in said frame adapted for connection in series with said contacts, said arm including means for engaging and opening said switch means when moved to its zero position.

12. In a switch adapted for controlling the supply of electric current to an electric heating apparatus; a frame, terminals on said frame for connection in the circuit to be controlled, an arm pivotally mounted in said frame connected with one of said terminals and having a first contact at its free end, a rod co-planar with said arm having one end flexibly mounted in said frame and adapted for supporting a second contact at its free end for engagement with said first contact, a resistance heating element in series of one of said terminals, thermal responsive means providing the support for said rod on said frame in thermal contact with said resistance heating element and flexing when heated to move said rod away from said arm, a magnet on one of said rod and arm adjacent the contact end thereof and an armature on the other thereof for being attracted by said magnet when the contacts are brought together, spring means urging said arm away from said rod toward a predetermined stopped position insufficient in strength to overcome the attraction of said armature for said magnet, and thermal responsive means associated with said rod at the contact end thereof adapted for receiving heat from said resistance heating element by conduction thereof along said rod and operable upon being heated to decrease the attraction between said magnet and armature to the point that said spring means will overcome said attraction.

13. An arrangement according to claim 12 in which a heat accumulating mass is associated with the contact end of said rod.

14. An arrangement according to claim 13 in which the said thermal responsive element at the contact end of said rod is an armature that decreases in magnetic properties as the temperature thereof increases and said magnet being mounted on said arm.

References Cited in the file of this patent

UNITED STATES PATENTS

| 2,162,343 | Brace | June 13, 1939 |
| 2,172,189 | Clark | Sept. 5, 1939 |
| 2,236,402 | Gomersall | Mar. 25, 1941 |
| 2,342,461 | Ettinger et al. | Feb. 22, 1944 |
| 2,371,018 | Ashworth et al. | Mar. 6, 1945 |